United States Patent
Zhu

(10) Patent No.: US 8,023,285 B2
(45) Date of Patent: Sep. 20, 2011

(54) CHIP CARD HOLDER

(75) Inventor: Hai-Feng Zhu, Shenzhen (CN)

(73) Assignees: Shenzhen Futaihong Precision Industry Co., Ltd., ShenZhen City, Guangdong Province (CN); FIH (Hong Kong) Limited, Kowloon (HK)

( * ) Notice: Subject to any disclaimer, the term of this patent is extended or adjusted under 35 U.S.C. 154(b) by 434 days.

(21) Appl. No.: 12/401,720

(22) Filed: Mar. 11, 2009

(65) Prior Publication Data
US 2009/0241303 A1 Oct. 1, 2009

(30) Foreign Application Priority Data
Mar. 31, 2008 (CN) .......................... 2008 1 0300794

(51) Int. Cl.
*H05K 7/04* (2006.01)
(52) U.S. Cl. .................. 361/810; 439/630; 235/486
(58) Field of Classification Search .............. 439/630, 439/628, 325, 625, 159; 235/486, 488, 492, 235/491, 379, 439, 441; 206/308.1, 303, 206/307, 449; 455/550.1, 575.1, 558, 561.6; 312/223.1, 223.2, 223.3; 361/679.55, 679.01, 361/737, 810, 820, 752, 759, 695
See application file for complete search history.

(56) References Cited

U.S. PATENT DOCUMENTS

| 6,421,246 B1 * | 7/2002 | Schremmer .................. 361/737 |
| 6,971,919 B1 | 12/2005 | Huang |
| 7,746,635 B2 * | 6/2010 | Lu .............................. 361/679.55 |
| 7,780,090 B2 * | 8/2010 | Long et al. ..................... 235/486 |
| 7,798,858 B1 * | 9/2010 | Zuo ............................... 439/630 |
| 2004/0190265 A1 | 9/2004 | Shaie |

FOREIGN PATENT DOCUMENTS

| CN | 1878183 A | 12/2006 |
| CN | 101030419 A | 9/2007 |

* cited by examiner

*Primary Examiner* — Hung Duong
(74) *Attorney, Agent, or Firm* — Altis Law Group, Inc.

(57) ABSTRACT

A chip card holder for a portable electronic device includes a body member and a cover member pivotally connected thereto. The body member defines a receiving groove for a chip card. The cover member includes a contact portion, a latching portion, and a connecting portion. The contact portion is pivotally connected to the body member and contacts the chip card. The latching portion latches to the body member. The connecting portion includes a first sheet portion and a second sheet portion. The first sheet portion connects to the second sheet portion, forming a gap therebetween. The contact portion connects to the first sheet portion, outside the gap. The latching portion connects to the second sheet portion, inside the gap.

14 Claims, 6 Drawing Sheets

CHIP CARD HOLDER

BACKGROUND

1. Field of the Disclosure

The present disclosure relates to chip cards and, particularly, to a chip card holder used in a portable electronic device.

2. Description of Related Art

Portable electronic devices such as mobile phones typically employ chip cards such as SIM cards for storing useful information. Chip card holders hold/secure the chip cards within the portable electronic devices.

A typical chip card holder includes a body member and a cover member pivotally connected thereto. The body member defines a receiving cavity receiving the chip card. The cover member includes a contact portion, a connecting portion and a latching portion. The connecting portion connects the contact portion to the latching portion. The latching portion has a first latching section. The body member has a second latching section corresponding to the first latching section. The cover member can be pivoted towards the body member until the first latching section interlocks with the second latching section. At this time, the contact portion presses and holds the chip card within the receiving cavity and the chip card is electrically connected to a chip card connector on a printed circuit board.

However, during installation and removal of the chip card, the connecting portion can generate surface stress due to deformation. Thus, the connecting portion may be damaged with frequent usage.

Therefore, there is room for improvement within the art.

BRIEF DESCRIPTION OF THE DRAWINGS

Many aspects of the chip card holder can be better understood with reference to the following drawings. These drawings are not necessarily drawn to scale, the emphasis instead being placed upon clearly illustrating the principles of the present chip card holder. Moreover, in the drawings like reference numerals designate corresponding sections throughout the several views.

DETAILED DESCRIPTION OF EXEMPLARY EMBODIMENT

Figure 1:
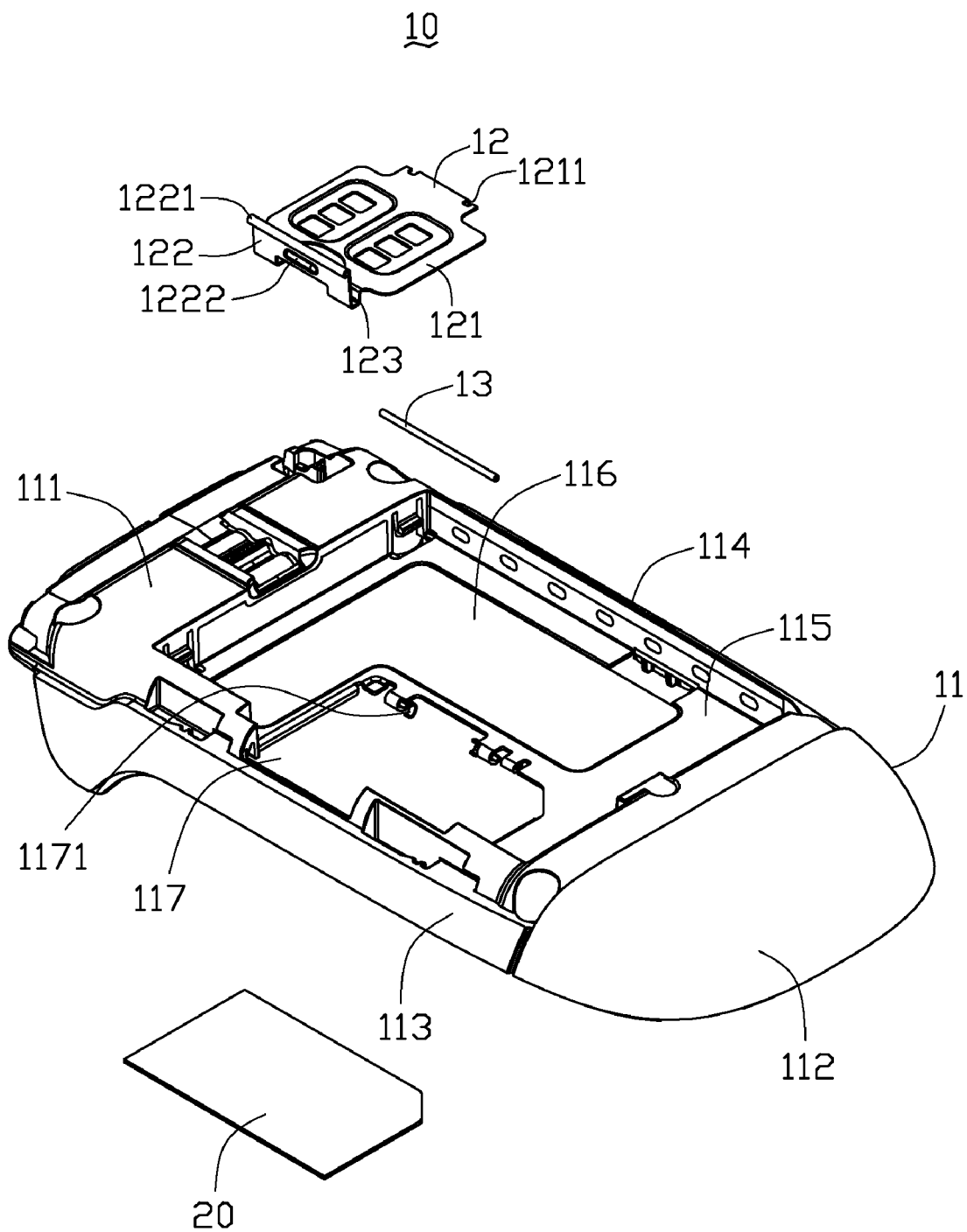
FIG. 1 is an exploded, isometric view of a chip card holder according to an exemplary embodiment.
Figure 2:
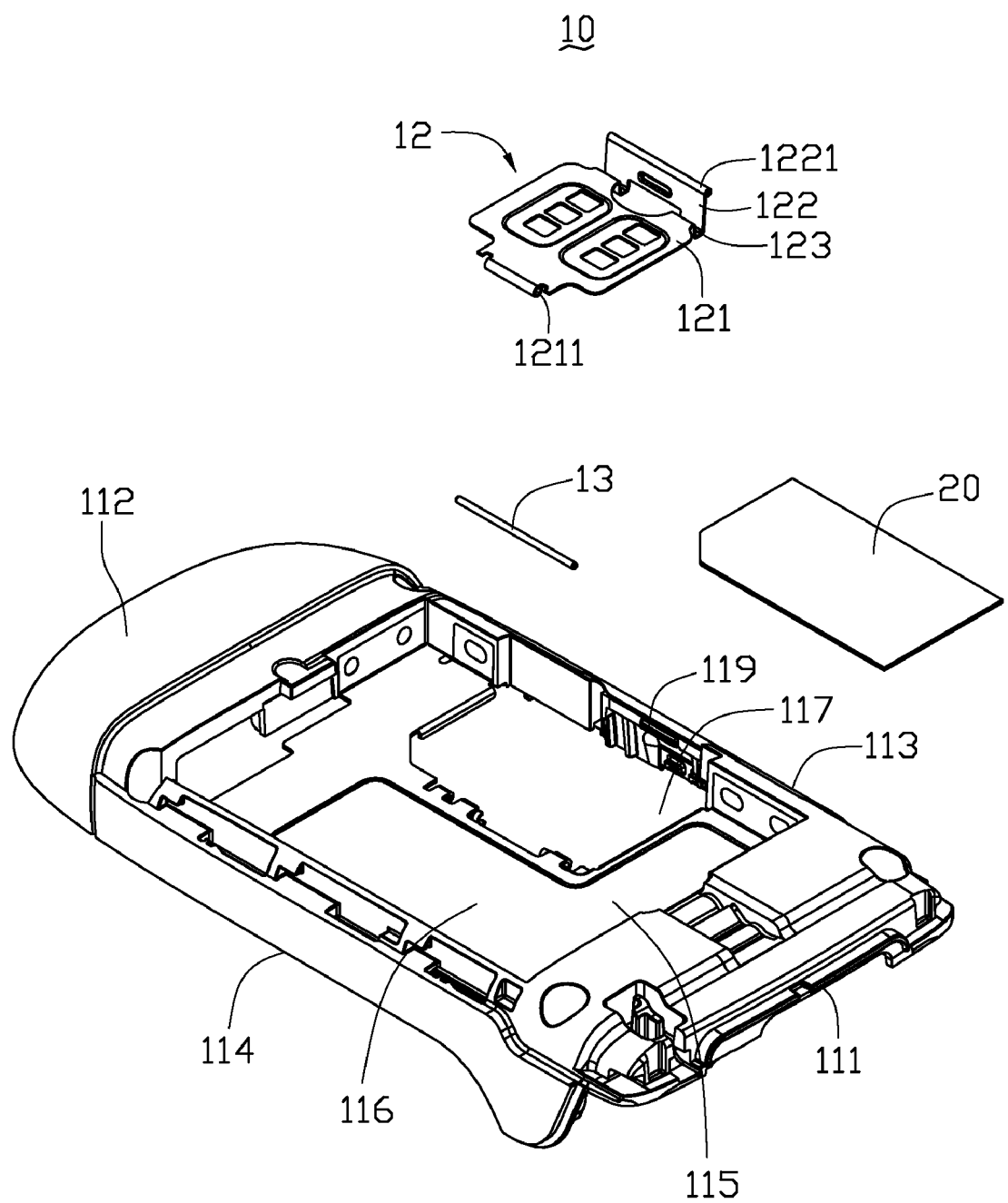
FIG. 2 is another exploded, isometric view of the chip card holder shown in FIG. 1.

FIGS. 1 and 2 show an exemplary chip card holder 10 for a chip card 20. The chip card holder 10 includes a body member 11, a cover member 12 and a shaft 13. The cover member 12 is pivotally connected to the body member 11 via the shaft 13.

The body member 11 has an upper wall 111, a lower wall 112, a first side wall 113, a second side wall 114 and a bottom wall 115, thereby defining a receiving space 116 for a battery (not shown). The bottom wall 115 defines a receiving groove 117, adjacent to the first side wall 113. The receiving groove 117 receives the chip card 20. In FIG. 2, a first latching block 119 protrudes from an inner surface of the first side wall 113 above the receiving groove 117. In FIG. 1, a mounting portion 1171 is arranged on a central portion of the bottom wall 115 adjacent to the receiving groove 117 and pivotally receives the shaft 13 thereon.

The cover member 12 is a generally L-shaped sheet including a contact portion 121, a latching portion 122 and a connecting portion 123. The connecting portion 123 connects the contact portion 121 to the latching portion 122.

The contact portion 121 includes a shaft sleeve 1211 opposite to the connecting portion 123. The shaft 13 is rotatably mounted in the shaft sleeve 1211.

A curved portion 1221 is formed at one end of the latching portion 122 distal to the connecting portion 123. A second latching block 1222 protrudes from the latching portion 122 between the curved portion 1221 and the connecting portion 123, thus defining a latching slot 1223 (best seen in FIG. 5). The first latching block 119 latches in the latching slot 1223.

Figure 5:
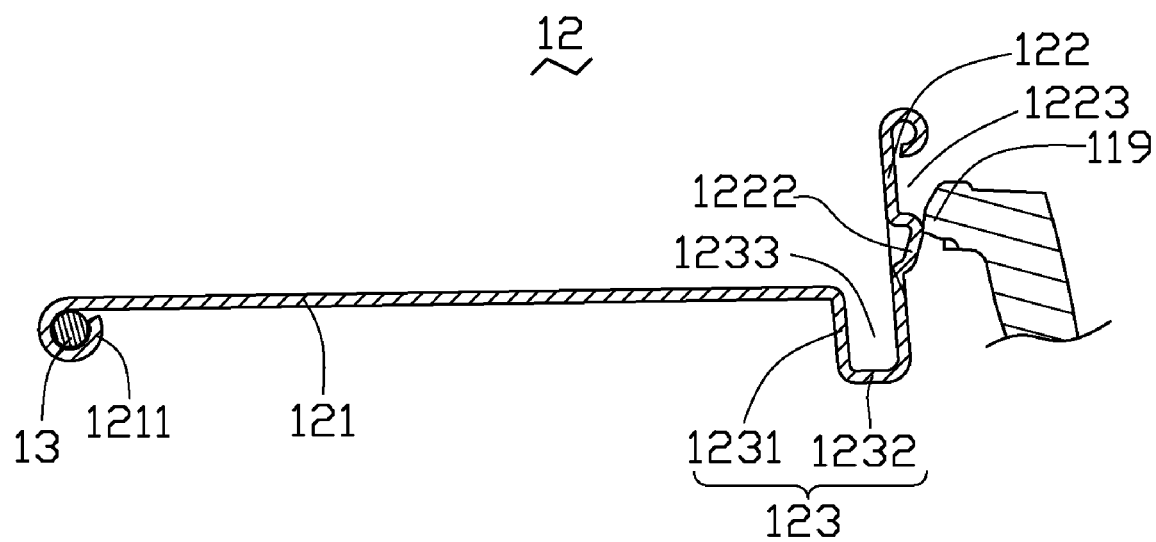
FIG. 5 is a cross-section of the chip card holder shown in FIG. 3 in a first position.

The connecting portion 123 is a generally L-shaped elastic sheet including a first sheet portion 1231 and a second sheet portion 1232 perpendicular to the first sheet portion 1231 (seen in FIG. 5). A gap 1233 is defined between the connecting portion 123 and the latching portion 122. The contact portion 121 perpendicularly connects to the first sheet portion 1231 out of the gap 1233. The latching portion 122 perpendicularly connects to the second sheet portion 1232 and in the gap 1233.

During assembly, the shaft 13 is rotatably mounted in the shaft sleeve 1211 of the cover member 12. The shaft 13 with the cover member 12 is pivotally mounted in the mounting portion 1171 of the body member 11.

Figure 3:
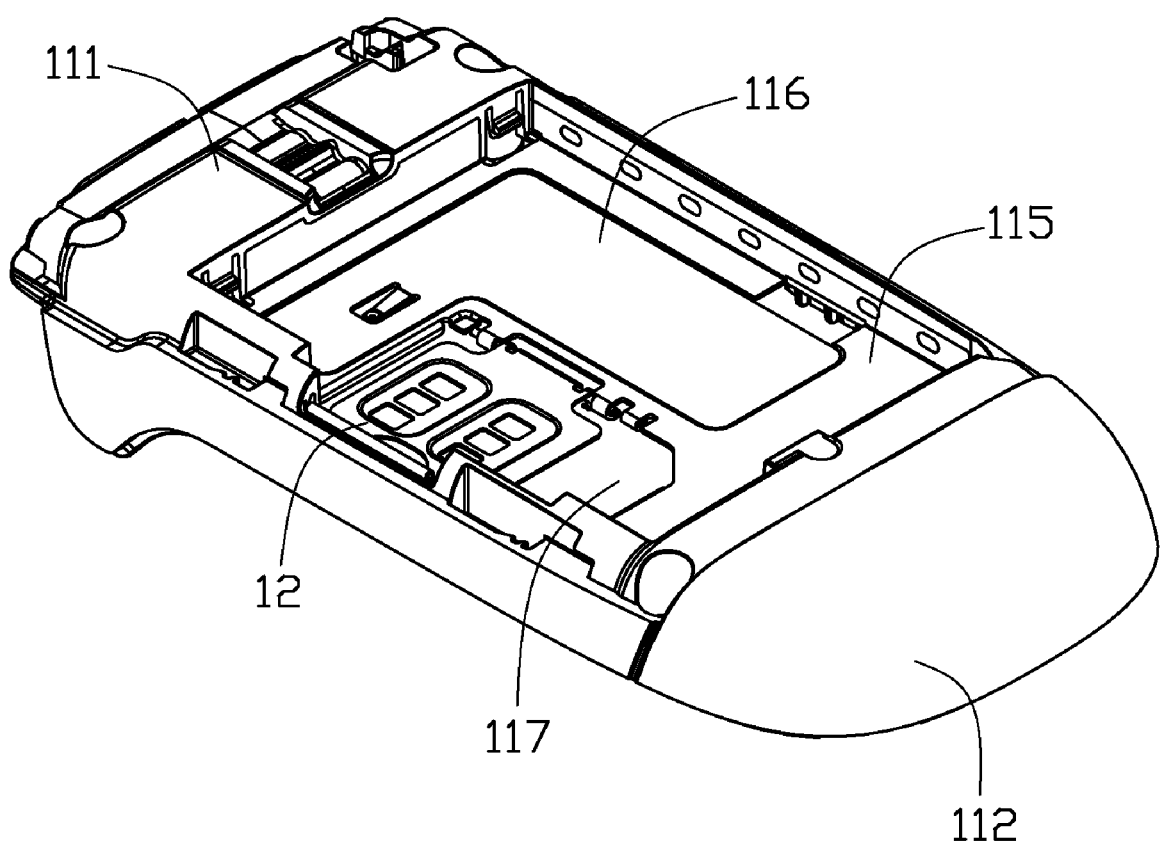
FIG. 3 is an isometric, assembled view of the chip card holder shown in FIG. 1.
Figure 4:
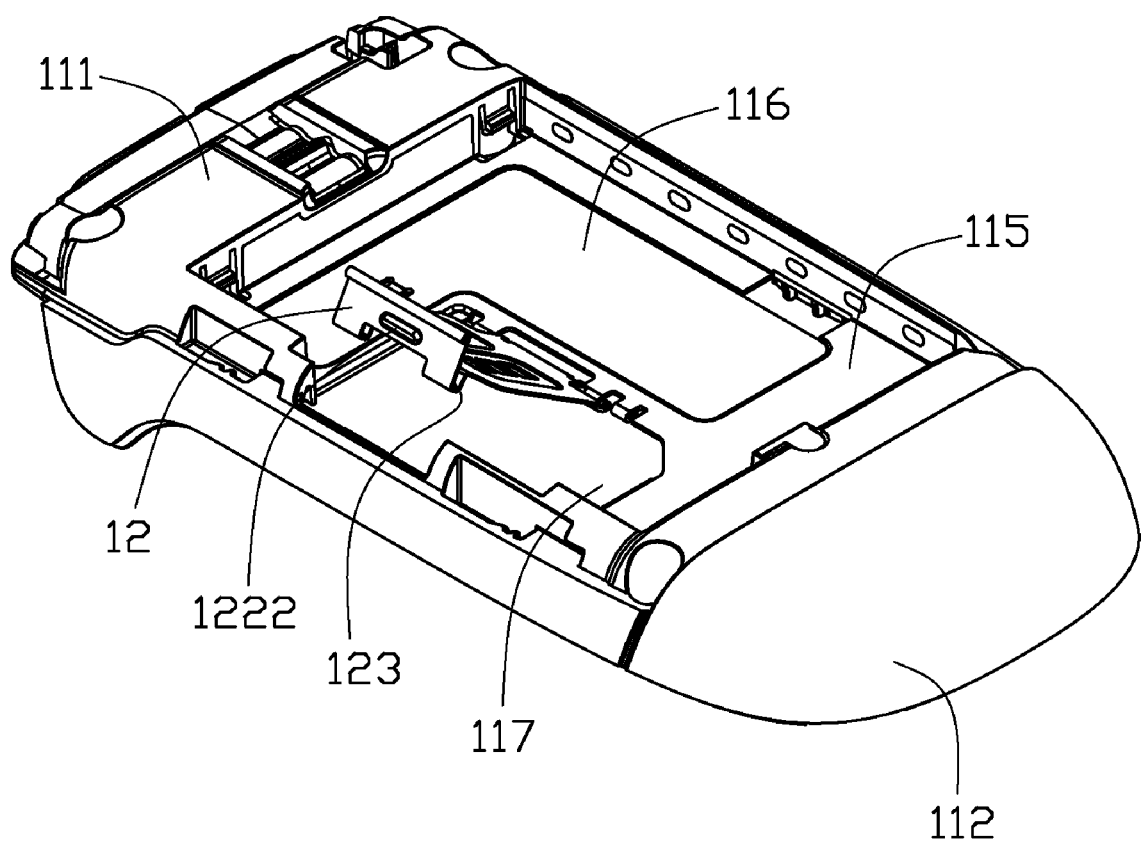
FIG. 4 is an isometric view of the chip card holder shown in FIG. 1 incorporating a chip card.

Referring to FIGS. 3 and 4, during installation of the chip card 20 onto the body member 11, the chip card 20 is received in the receiving groove 117. The cover member 12 is manually rotated towards the receiving groove 117 until the second latching block 1222 passes the first latching block 119 and the first latching block 119 engages the latching slot 1223. Thus, the chip card 20 is stably electrically connected to a SIM card connection under the contact portion 121 and maintained inside the receiving groove 117.

Figure 6:
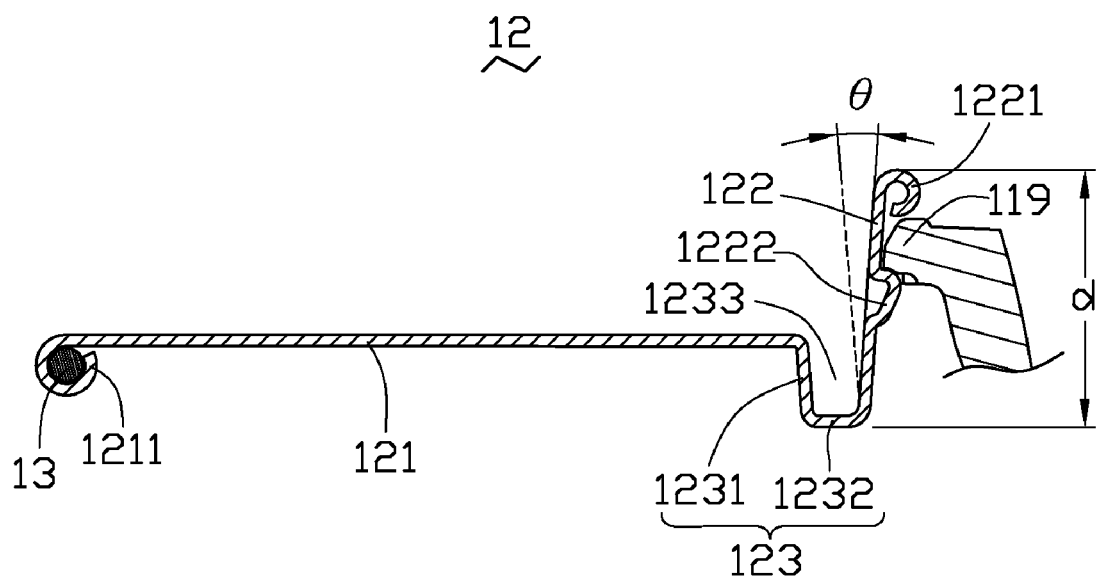
FIG. 6 is a cross-section of the chip card holder shown in FIG. 3 in a second position.

Referring to FIG. 5 and FIG. 6, applied tensile force of the latching portion 122 (designated by d) is increased via the connecting portion 123. Thus, the latching portion 122 need only be rotated by a small angle θ, providing engagement between the second latching block 1222 and the first latching block 119. Therefore, surface stress on the connecting portion 12 is significantly reduced, prevents breakage of cover member 12.

For removal of chip card 20 from the receiving groove 117, the process is reversed and the cover member 12 is pivoted away from the receiving groove 117.

In alternative embodiments, the first sheet portion 1231 can connect to the contact portion 121 at an obtuse or acute angle, to the second sheet portion 1232 at an obtuse or acute angle, or to the latching portion 122 at an obtuse or acute angle.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A chip card holder, comprising:
   a body member defining a receiving groove receiving a chip card therein; and
   a cover member; the cover member including a contact portion, a latching portion and a connecting portion, the contact portion being pivotally connected to the body member and contacting the chip card, the latching portion being releasably latched to the body member, the connecting portion connecting the contact portion to the latching portion, the connecting portion comprising a first sheet portion and a second sheet portion, wherein the first sheet portion connects to the second sheet portion, thus forming a gap therebetween, the contact portion is connected to the first sheet portion and outside the gap, and the latching portion is connected to the second sheet portion and outside the gap.

2. The chip card holder as claimed in claim 1, wherein the first sheet portion connects to the second sheet portion at a perpendicular, obtuse, or acute angle.

3. The chip card holder as claimed in claim 1, wherein the first sheet portion connects to the contact portion at a perpendicular, obtuse, or acute angle.

4. The chip card holder as claimed in claim 1, wherein the second sheet portion connects to the latching portion at a perpendicular, obtuse, or acute angle.

5. The chip card holder as claimed in claim 1, wherein a curved portion is arranged at one end of the latching portion distal to the connecting portion.

6. The chip card holder as claimed in claim 5, wherein a second latching block protrudes from the latching portion between the curved portion and the connecting portion, thus defining a latching slot, and the body member has a first latching block configured for engaging the latching slot.

7. The chip card holder as claimed in claim 1, further comprising a shaft, wherein the contact portion arranges a shaft sleeve distal to the connecting portion, the body member arranges a mounting portion adjacent to the receiving groove, and the shaft sleeve pivotally connects to the mounting portion via the shaft.

8. A cover member rotatably mounted to a body member defining a receiving groove receiving a chip card therein, the cover member comprising:
   a contact portion pivotally connected to the body member and contacting the chip card;
   a latching portion releasably latched to the body member; and
   a connecting portion connecting the contact portion to the latching portion, the connecting portion including a first sheet portion and a second sheet portion, wherein the first sheet portion connects to the second sheet portion, thus forming a gap therebetween, the contact portion is connected to the first sheet portion and outside the gap, and the latching portion is connected to the second sheet portion and outside the gap.

9. The cover member as claimed in claim 8, wherein the first sheet portion connects to the second sheet portion at a perpendicular, obtuse, or acute angle.

10. The cover member as claimed in claim 8, wherein the first sheet portion connects to the contact portion at a perpendicular, obtuse, or acute angle.

11. The cover member as claimed in claim 8, wherein the second sheet portion connects to the latching portion at a perpendicular, obtuse, or acute angle.

12. The cover member as claimed in claim 8, wherein a curved portion is arranged at one end of the latching portion distal to the connecting portion.

13. The cover member as claimed in claim 12, wherein a second latching block protrudes from the latching portion between the curved portion and the connecting portion, thus defining a latching slot, and the body member has a first latching block configured for engaging the latching slot.

14. The cover member as claimed in claim 8, further comprising a shaft, wherein the contact portion arranges a shaft sleeve distal to the connecting portion, the body member arranges a mounting portion adjacent to the receiving groove, and the shaft sleeve pivotally connects to the mounting portion via the shaft.

* * * * *